Patented Nov. 3, 1931

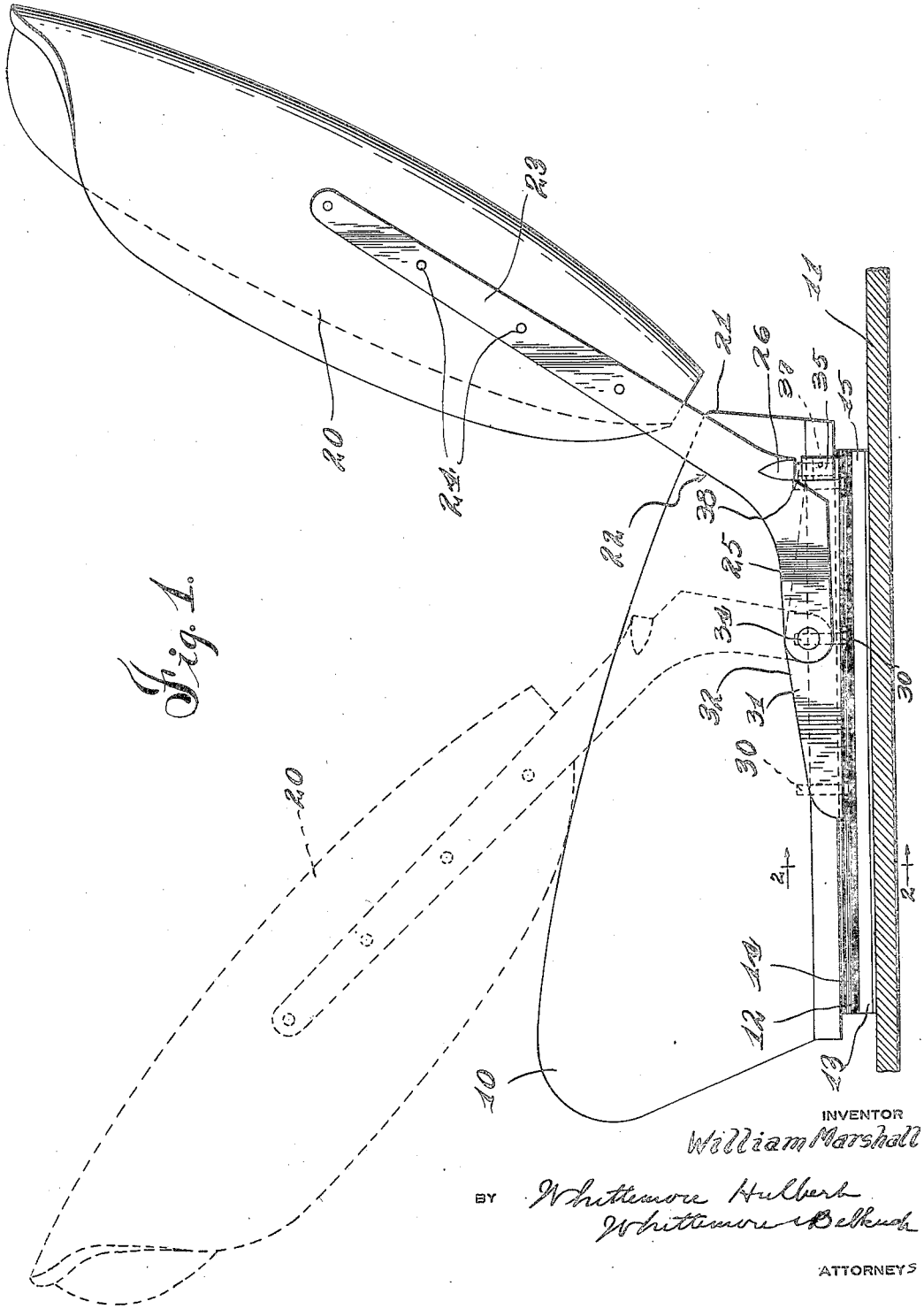

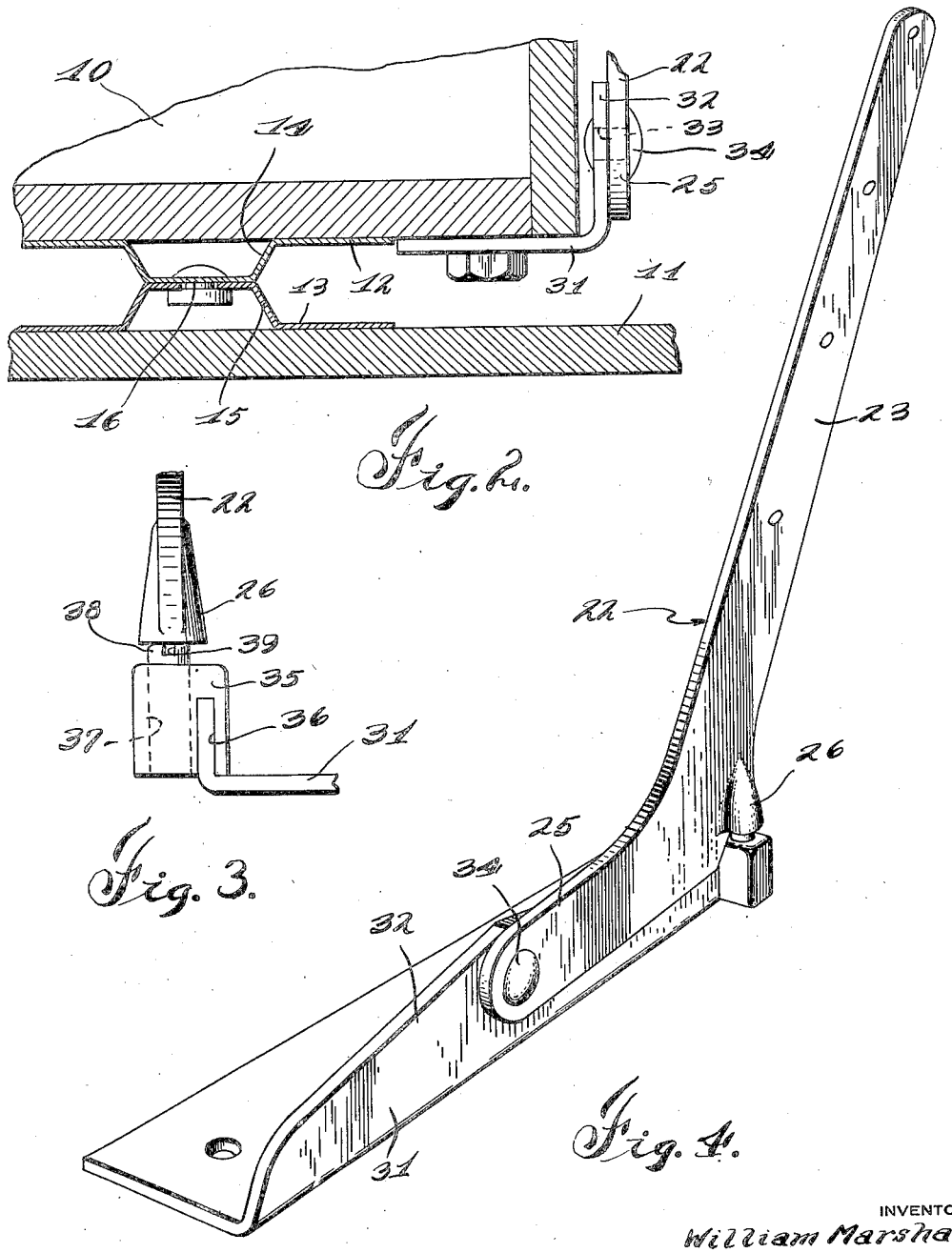

1,830,119

UNITED STATES PATENT OFFICE

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN

SEAT CONSTRUCTION

Application filed December 31, 1928. Serial No. 329,427.

This invention relates to seat constructions and has particular reference to a vehicle seat construction having a back movable relative to the seat.

An object of this invention is to provide a seat construction in which the back is so connected to the seat as to permit swinging of the back as a unit to a position where all portions of the back are spaced a substantial distance forwardly of the rear edge of the seat.

A further object of this invention is to provide a seat construction in which the back may be folded down over the seat and having adjustable means for limiting the movement of the back to an upright position, whereby the angle of the back relative to the seat may be varied.

A still further object of this invention is to provide a seat construction, in which the back may be folded over the seat, which shall be simple in construction and yet thoroughly efficient in operation.

Other objects and advantages of this invention will become more apparent as the following description proceeds, particularly when reference is had to the accompanying drawings wherein Figure 1 is an elevational view of a vehicle seat constructed in accordance with the teachings of this invention, the folded position of the back being shown in dotted lines, Figure 2 is a fragmentary sectional view taken substantially on the line 2—2 of Figure 1, and Figure 3 is a fragmentary elevational view of a portion of the structure shown in Figure 1.

Figure 4 is a perspective view of the bracket assembly.

Heretofore in seat constructions in which the back has been adapted to be folded over the seat, it has been customary to hinge the back to a bracket supported at the upper rear edge of the seat. This construction has not been entirely satisfactory, since when the back is hingedly mounted in this manner, it is substantially impossible to swing the back far enough forwardly to give the desired room in back of the seat. The present invention contemplates the elimination of this difficulty by hinging the back to the seat by means of a bracket pivotally connected to the seat adjacent its lower edge and at a substantial distance forwardly of its rear edge. With a hinge of this character, it is possible to swing the back as a unit to a position a substantial distance forwardly of the rear edge of the seat, so that plenty of room is provided in back of the seat for the passage of persons into and out of the vehicle.

Referring now particularly to the drawings wherein like reference characters designate corresponding parts throughout all views, the numeral 10 designates a vehicle seat which may be supported from the floor 11 of the vehicle as by means of the plates 12 and 13 secured to the bottom of the seat 10 and the floor 11 respectively, these plates being provided with offset portions 14 and 15 secured together as by the securing means designated generally by the reference character 16. The attachment of the seat 10 to the floor 11 forms no part of the present invention, the same being described and claimed in my companion case, filed December 31, 1928, Serial Number 329,426.

The seat 10 is provided with a back 20 adapted to be swung from the position shown in full lines in Figure 1 of the drawings to the position shown in dotted lines in this figure. By reference to the dotted line showing in Figure 1 of the drawings it will be noted that the back 20 may be swung to a position where all portions of the back are spaced a substantial distance forwardly of the rear edge 21 of the seat 10. This movement of the back 20 increases to a considerable extent the clearance in back of the seat 10, thus facilitating the movement of persons into and out of the vehicle in which the seat 10 is mounted.

The swinging of the back 20 to the position shown in dotted lines in the drawings is permitted by virtue of the pivotal connection between the back and the seat, this connection including a bracket having a forwardly extending portion pivotally mounted adjacent the lower edge of the seat and at a point spaced a considerable distance from the rear edge of the seat. This bracket is preferably pivoted to a plate carried by the seat and this plate is provided with means adjustably limiting the movement of the bracket about its pivot to vary the angle of the back to the seat when the back is in the position shown in full lines in Figure 1 of the drawings.

The connection between the back and the seat includes a pair of brackets, one being arranged at each side of the back 20. Each bracket includes a bell crank shaped member designated generally by the reference character 22. One leg 23 of this member is secured to the frame work (not shown) of the back 20 as by the securing members 24. The other leg 25 of the bracket 22 extends forwardly of the seat 10 adjacent the lower edge thereof and is pivotally mounted at a point spaced from the rear edge of the seat 10 in a manner hereinafter to be more fully described. Intermediate the legs 23 and 25 the bracket 22 is provided with an enlarged heel portion 26 which cooperates with the adjustable stop member hereinafter also to be more fully described.

Secured to the bottom of the seat 10 as by the securing members 30 is an angle plate 31 the free leg 32 of which is arranged adjacent the side of the seat and adjacent the lower edge of the seat. Intermediate its ends the leg 32 of the angle plate 31 is provided with the aperture 33 through which a pivot pin 34 extends for pivoting the end of the leg 25 of the bracket 22 to the plate 31. Thus it will be seen that the bracket 22 is pivoted to the plate 31 at a point adjacent the lower edge of the seat 10 and at a point spaced a substantial distance forwardly of the rear edge of the seat 10, whereby when the back is swung forwardly to folded position the bracket 22 will move about its pivot to permit movement of the back to a position spaced a substantial distance forwardly of the rear edge 21 of the seat 10.

Adjacent the rear edge of the seat 10, there is mounted on the plate 31 a lug 35. While this lug may be secured to the plate 31 in any desired manner, it has been found convenient to provide a recess 36 in the lug 35 adapted to receive the leg 32 of the plate 31 as clearly illustrated in Figure 3 of the drawings. The recess 36 may be of such a size as to tightly receive the leg 32 so that no other securing means is necessary, or if desired, the lug 35 may be riveted or welded to the leg 32 after the same is in the position shown in Figure 3 of the drawings.

The lug 35 is provided with a vertically extending threaded bore 37 adapted to threadedly receive a threaded pin 38, this pin constituting an abutment member adapted to be engaged by the heel 26. The end of the pin 38 is provided with the slot 39 for engagement by a suitable tool whereby the pin 38 may be threadedly adjusted in the lug 35 to vary its elevation.

When the back 20 is in the position shown in full lines in Figure 1 of the drawings the heel 26 of the bracket 22 rests on the end of the abutment member 38, this member limiting movement of the bracket 22 about its pivot in one direction. Obviously adjustment of the member 38 in the lug 35 varies the elevation of the member 38 and thus varies the angle of the back 20 relative to the seat 10. The member 38 serves therefore not only to limit movement of the bracket 22 about its pivot to support said back in a substantially upright position, but serves also to facilitate an adjustment of the angle of the back relative to the seat.

From the above it is believed that the structure and use of the invention will be readily apparent. The back 20 being connected to the seat 10 by a bracket having a forwardly extending portion pivoted adjacent the lower edge of the seat 10 and forwardly of the rear edge thereof, may be swung to a position where the entire back is in a position a substantial distance forwardly of the rear edge of the seat 10. This provides sufficient clearance in back of the seat 10 to permit the passage of persons into and out of the vehicle. Further the adjustable member 38 supports the back in a substantially upright position when the back is swung to its position of use and serves also to facilitate the adjustment of the angle of the back relative to the seat whenever such adjustment is desired.

While the invention has been described with considerable detail, it will be understood that the description is for the purpose of illustration only and is not definitive of the limits of the inventive idea. The right is therefore reserved to make such changes in the details of construction and arrangement of parts as will fall within the purview of the attached claims.

What I claim as my invention is:

1. In a vehicle seat construction, a seat, a back for said seat, a plate extending along one side of said seat at the lower edge thereof, a bracket having a relatively long portion fixed to said back and having a relatively short portion pivoted to said plate substantially midway of its ends, and adjustable means for limiting movement of said bracket about its pivot in one direction, said means including a heel formed on said bracket at the junction of said long and short portions, and a member carried by said plate and engageable with said heel.

2. In a vehicle seat construction, a seat, a back for said seat, a bracket extending along one side of said seat and terminating adjacent to its rear edge, a lug rising from said bracket at the rear end thereof, and a connection between said seat back and seat including a lever having a portion rigid with the seat back, having another portion extending along one side of said seat and pivoted thereto at a point substantially midway between the front and rear edges, and having a heel at the junction of said portions resting upon the lug at the rear end of said seat bracket.

3. In a vehicle seat construction, an angle bar having a base portion and an upright portion, the base portion being attachable to the bottom of a seat and provided with openings for receiving securing means, a lug rigid with one portion aforesaid of said bar at one end thereof, a vertically adjustable pin threadedly engaging the lug, a pivot pin extending transversely of the upright portion of the angle bar, and a seat back supporting bracket of substantially L configuration having the base of the L extending along one side of the upright portion of the angle bar, the base portion of said bracket being provided at its forward end with an opening receiving the pivot pin aforesaid and provided at its rear end with a heel resting on the vertically adjustable pin in said lug.

In testimony whereof I affix my signature.

WILLIAM MARSHALL.